US 6,735,810 B2

(12) United States Patent
Najm et al.

(10) Patent No.: US 6,735,810 B2
(45) Date of Patent: May 18, 2004

(54) VACUUM CLEANING SYSTEM FOR RECREATIONAL VEHICLES

(75) Inventors: Joseph L. Najm, Strongsville, OH (US); Steve Porath, Painesville, OH (US); James Malone, Naples, FL (US)

(73) Assignee: HMI Industries, Inc., Seven Hills, OH (US)

( * ) Notice: Subject to any disclaimer, the term of this patent is extended or adjusted under 35 U.S.C. 154(b) by 260 days.

(21) Appl. No.: 10/059,741

(22) Filed: Jan. 31, 2002

(65) Prior Publication Data

US 2003/0140443 A1 Jul. 31, 2003

(51) Int. Cl.[7] .................................................. B60S 1/64
(52) U.S. Cl. ...................................................... 15/313
(58) Field of Search .............................. 15/301, 313, 314

(56) References Cited

U.S. PATENT DOCUMENTS

| | | | | |
|---|---|---|---|---|
| 2,861,586 A | * | 11/1958 | Dobbs | 137/360 |
| 3,088,484 A | * | 5/1963 | Marsh | 137/360 |
| 3,286,446 A | | 11/1966 | Happe et al. | |
| 3,384,916 A | * | 5/1968 | Hockin | 15/313 |
| 3,431,581 A | * | 3/1969 | Booth | 15/313 |
| 4,072,097 A | * | 2/1978 | Seibel | 100/100 |
| 4,336,427 A | * | 6/1982 | Lindsay | 200/61.6 |
| 5,829,091 A | * | 11/1998 | Ingram et al. | 15/313 |

FOREIGN PATENT DOCUMENTS

FR       2799415     *   4/2001

OTHER PUBLICATIONS

RV 2000 MAZUM product brochure, H–P Products, Inc., circa 2000.

Intervac Design "A Compact and Powerful Line of Built–In Central Vacuum Cleaners," 3 pages, Copyright 2000, http://www.intervacdesign.com/index.html.

* cited by examiner

*Primary Examiner*—Terrence R. Till
(74) *Attorney, Agent, or Firm*—Fay, Sharpe, Fagan, Minnich & McKee

(57) ABSTRACT

A vacuum cleaning system for a recreational vehicle having an internal compartment including a floor and a plurality of walls extending upwardly from the floor comprises a vacuum cleaner having a suction inlet, a vacuum hose having inlet and outlet ends and a vacuum line in or extending along one of the walls. The vacuum line is connected to the suction inlet of the vacuum cleaner and to the outlet end of the vacuum hose for cleaning the compartment. The vacuum cleaner can be portable and releasably connected to the vacuum line from outside the vehicle, or can be mounted inside the vehicle and permanently connected to the vacuum line.

60 Claims, 5 Drawing Sheets

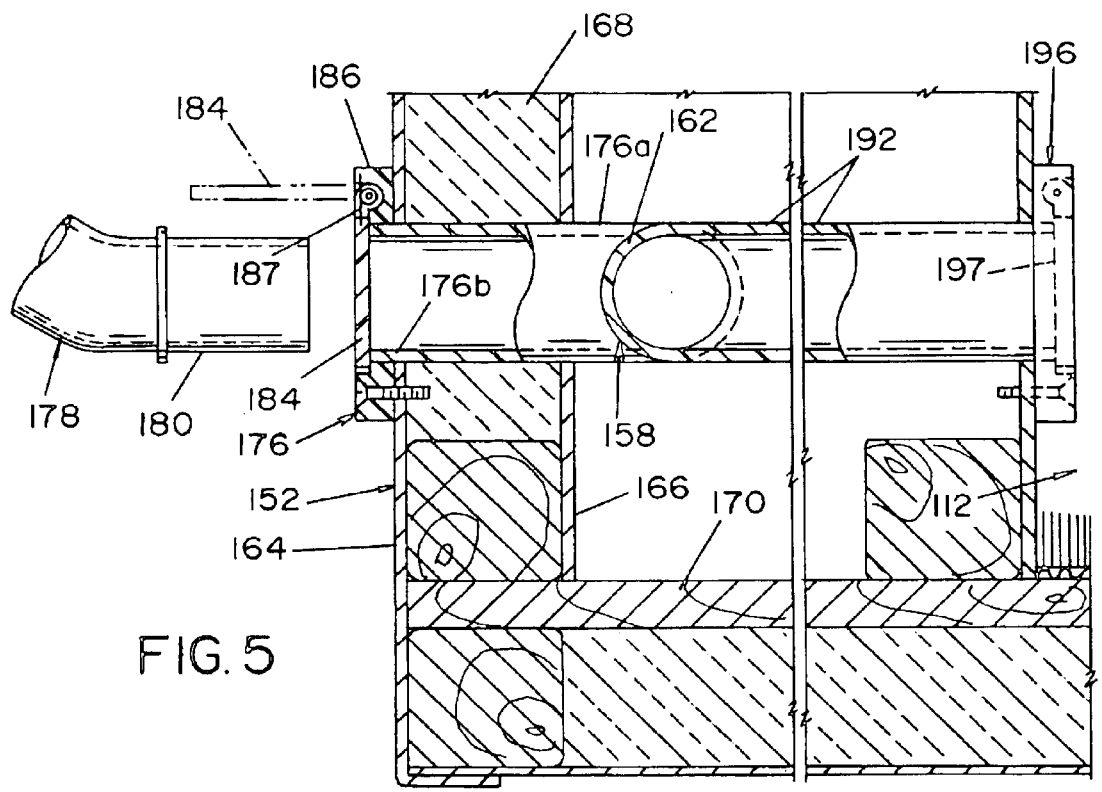
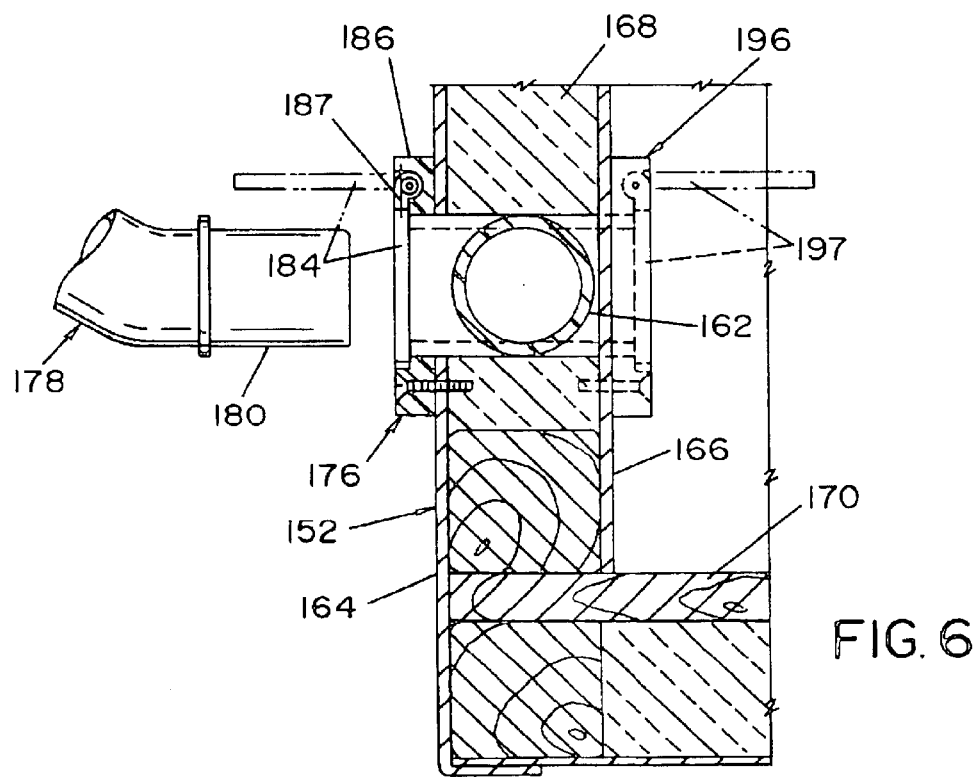

VACUUM CLEANING SYSTEM FOR RECREATIONAL VEHICLES

BACKGROUND OF THE INVENTION

This invention relates to the art of recreational vehicles and, more particularly, to a central vacuum cleaning system for such vehicles.

The popularity and use of recreational vehicles, such as motor homes and trailers, has increased dramatically over the past few years. Such vehicles vary in length from about 15 feet to over 40 feet in length, and the interiors thereof include many of the accommodations of a home such as, for example, a bedroom, bathroom, kitchen, and living area. The floors of these vehicles are covered with wood, linoleum, tile, and/or carpeting, and the living areas generally include upholstered furniture such as couches and/or chairs. As is well known, recreational vehicles are used for a wide variety of recreational activities including vacations and weekend camping during which the vehicle is most often parked in a campground or camping area in a state or national park. In any event, the environment is generally one in which the ground is primarily dirt or gravel whereby, even with the utmost care, it is difficult to avoid tracking dirt and the like into the vehicle. Most vehicle owners store a broom in the vehicle for cleaning purposes, but a broom is generally inadequate for cleaning floor surfaces which are carpeted. Moreover, the use of a broom on carpet causes dust which accumulates on the upholstered furniture and/or other surfaces within the vehicle, thus adding to the problem of keeping the interior clean. Other vehicle owners carry a standard home vacuum cleaner, provided the vehicle is of a size which accommodates the storage thereof. Storage space in a recreational vehicle is always at a premium, and the space required to store a standard sized upright or canister-type vacuum cleaner, whether internal or external of the vehicle, takes away from the space available for other supplies and/or equipment which the owner would like to include for a given excursion. Moreover, the use of a standard vacuum cleaner in a recreational vehicle is both cumbersome and inefficient. In particular in this respect, the areas to be cleaned are often quite small and unable to accommodate movement of an upright-type vacuum cleaner thereacross and, where movement is possible, the pushing or pulling of an upright cleaner or the canister of the canister-type vacuum cleaner is cumbersome and promotes damage to walls and other surfaces extending up from the floor of the vehicle. Small, hand-held cleaners are inadequate in that they do not have enough cleaning power and, moreover, require the user to bend over or kneel down in order to vacuum floor areas.

An alternative to the foregoing use of portable vacuum cleaners is a built-in vacuum system including a vacuum cleaner which hangs on or is recessed into a wall in the recreational vehicle. A flexible hose is attachable to the vacuum cleaner and is stretchable up to 30 feet from the vacuum cleaner and is wrapped around the latter for storage. In addition to the disadvantage of the vacuum and hose projecting outwardly from the wall on which it is supported, there is a significant and progressively increasing loss in cleaning power as the flexible hose is stretched beyond the usual six foot to eight foot length of such hoses. Still further, if the hose is stretchable up to 30 feet it is either heavy and cumbersome to maneuver or, if lightweight for the latter purpose, is subject to damage such as through puncturing and abrasive wear from engagement with corners of walls, appliances or the like which would necessarily be encountered in connection with extending and retracting the hose throughout the interior of the vehicle. Still further, such engagement of the hose with corners and other surfaces in the vehicle subjects the latter to damage such as scratching, gouging and the like.

SUMMARY OF THE INVENTION

In accordance with the present invention, a recreational vehicle is provided with a central vacuum cleaning system which overcomes or avoids the foregoing and other disadvantages of vacuum cleaning systems heretofore available for use in recreational vehicles. More particularly in this respect, a central vacuum system in accordance with the invention comprises a small vacuum cleaner having a suction inlet connected to or connectable to a vacuum line in the internal compartment of a recreational vehicle, or in a wall thereof, and which vacuum line has at least one coupling for connecting the vacuum line to a vacuum hose for vacuum cleaning the compartment. The vacuum line can be inwardly adjacent a wall of the recreational vehicle extending upwardly from the floor thereof and, in this respect, enables the central vacuum system to be installed in existing recreational vehicles. Alternatively, the vacuum line can be within a wall of the vehicle between wall panels providing the wall and, accordingly, can be designed and built into a new recreational vehicle in connection with the construction thereof.

The vacuum cleaner itself can be a relatively small, canister-like cleaner which, in accordance with one aspect of the invention, is portable, storable in a relatively small space, and removably connected to the vacuum line during periods of use. In accordance with this aspect of the invention, the vacuum cleaner can be stored internally or externally of the recreational vehicle and can be connected to the vacuum line either internally or externally of the vehicle. More particularly in this respect, a coupling in the vacuum line for connection to the suction inlet of the vacuum cleaner can be accessible within the vehicle or from a location outside the vehicle and, alternatively, couplings can be provided for selectively accessing the vacuum line from within or without the vehicle. If the vacuum cleaner is connected to the vacuum line at a location outside the vehicle, it will be appreciated that the only appliance necessary for vacuum cleaning the interior of the vehicle compartment is the vacuum hose and an appropriate tool attached thereto. Moreover, depending on the length of the vehicle compartment and/or the internal configuration thereof, more than one coupling can be provided in the vacuum line for connecting the vacuum hose thereto to facilitate cleaning different areas of the compartment with a relatively short vacuum hose, thus minimizing the storage space required for the hose.

In accordance with another aspect of the invention, a canister-type vacuum cleaner can be Amounted within the vehicle, such as in a closet area or in an under-the-counter area with the suction inlet thereof being coupled directly to the vacuum line whereby, again, the only appliance exposed in the vehicle compartment during cleaning thereof is the flexible hose and tool which are connectable to the vacuum line as described above. In any event, a central vacuuming system according to the invention advantageously minimizes the space occupied by cleaning appliances during vacuum cleaning of the interior of a recreational vehicle by either having the vacuum cleaner located outside the vehicle or within an enclosure within the vehicle. Moreover, the ability to selectively connect the vacuum cleaning hose to one or more couplings along the length of the vacuum line advantageously enables the use of a relatively short vacuum cleaning hose, thus minimizing the storage space required therefor.

It is accordingly an outstanding object of the present invention to provide an improved vacuum cleaning system for recreational vehicles.

Another object is the provision of the vacuum cleaning system for the foregoing purpose which minimizes the amount and size of vacuum cleaning equipment required within the compartment of a motor vehicle during a vacuum cleaning operation.

Yet another object is the provision of a vacuum cleaning system for the foregoing purpose which includes a vacuum line permanently installed relative to the interior compartment of a recreational vehicle and a portable vacuum hose for connection therewith to facilitate cleaning different areas within the compartment.

Still another object is the provision of a vacuum cleaning system of the foregoing character including a relatively small vacuum cleaner which can be permanently installed within a storage space of the vehicle so as to be unexposed within the vehicle compartment.

A further object is the provision of a vacuum cleaning system of the foregoing character in which the vacuum cleaner is portable and connectable to the vacuum line from inside or outside the vehicle.

Yet a further object is the provision of a vacuum cleaning system of the foregoing character which can be installed in an existing recreational vehicle or installed in a new vehicle in connection with the construction thereof.

Still a further object is the provision of a vacuum cleaning system of the foregoing character which requires a minimum amount of storage space, is readily rendered operable, which is more convenient to use than systems heretofore available, and which promotes protection for the vacuum hose of the system as well as for surfaces and components within the vehicle compartment exposed to engagement thereby.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 5 is a cross-sectional elevation view of the vacuum line of the system taken along line 5—5 in FIG. 4;

FIG. 6 is a sectional elevation view showing a modification of the vacuum line location in the vehicle in the embodiment of FIGS. 4 and 5; and, FIG. 7 is a plan view, in sectional, of a diverter valve which can be used with the system shown in FIGS. 4–6.

DESCRIPTION OF PREFERRED EMBODIMENTS

Figure 1:
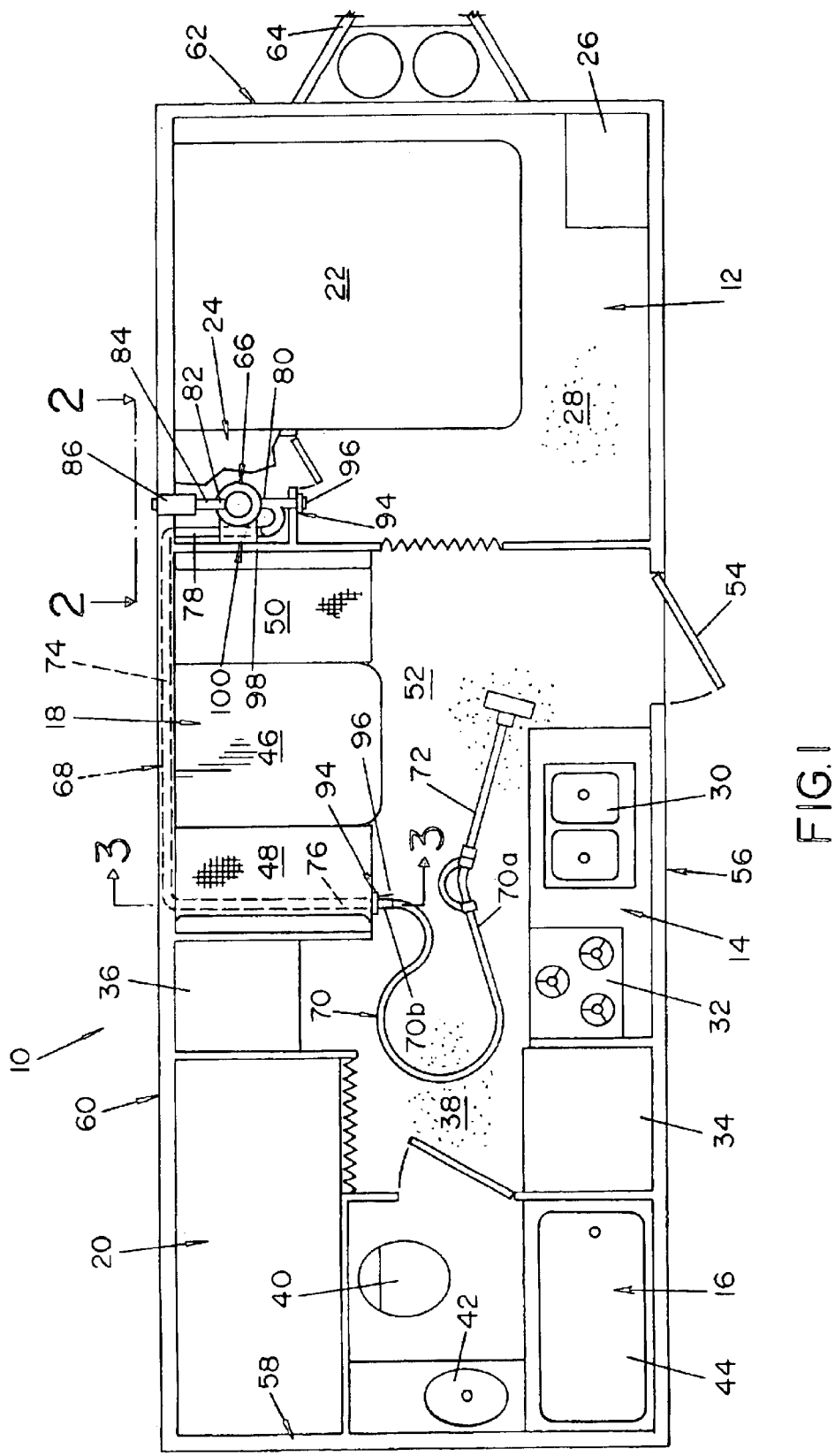
FIG. 1 is a plan view of a recreational vehicle having a central vacuum cleaning system in accordance with the invention.

Referring now in greater detail to the drawings, wherein the showings are for the purpose of illustrating preferred embodiments of the invention only, and not for the purpose of limiting the invention, FIG. 1 somewhat schematically illustrates the interior of a recreational vehicle in the form of a trailer 10 having an interior compartment which includes a bedroom 12, kitchen area 14, bathroom 16, dining area 18, and a bunk bed area 20. Bedroom 12 includes a bed 22, closets 24 and 26, and a carpeted floor 28, and kitchen area 14 includes a sink 30, range 32, refrigerator 34, storage closet 36, and carpeted floor 38. Bathroom 16 includes a lavatory 40, sink 42 and bathtub 44, and dining area 18 includes a table 46, upholstered benches 48 and 50 on opposite sides thereof, a carpeted floor 52, and an entrance door 54. The interior vehicle compartment is defined by exterior walls 56, 58, 60, and 62 extending upwardly from the floor of the vehicle. Wall 58 is at the rear end of the vehicle, and wall 62 is at the front end of the vehicle which includes hitching components 64 for towing the trailer.

Figure 2:
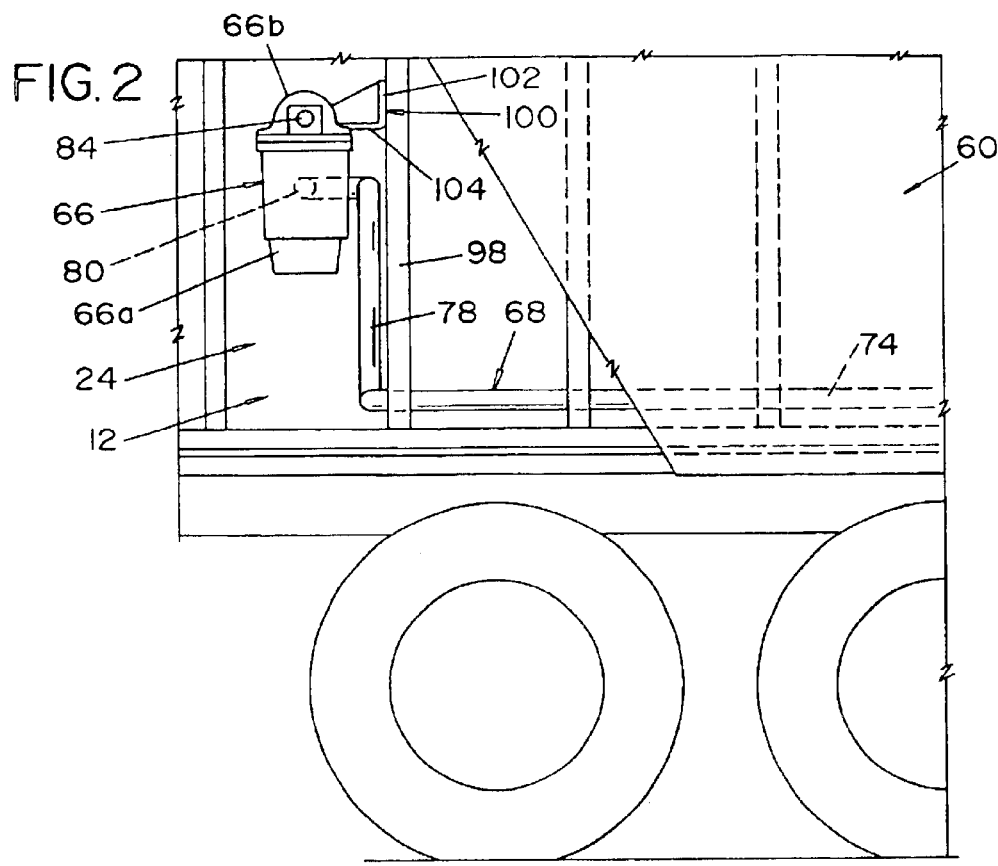
FIG. 2 is an enlarged fragmentary side elevation view taken on line 2—2 of FIG. 1 with parts broken away of the vacuum cleaner of the system mounted in a storage area in the vehicle.
Figure 3:
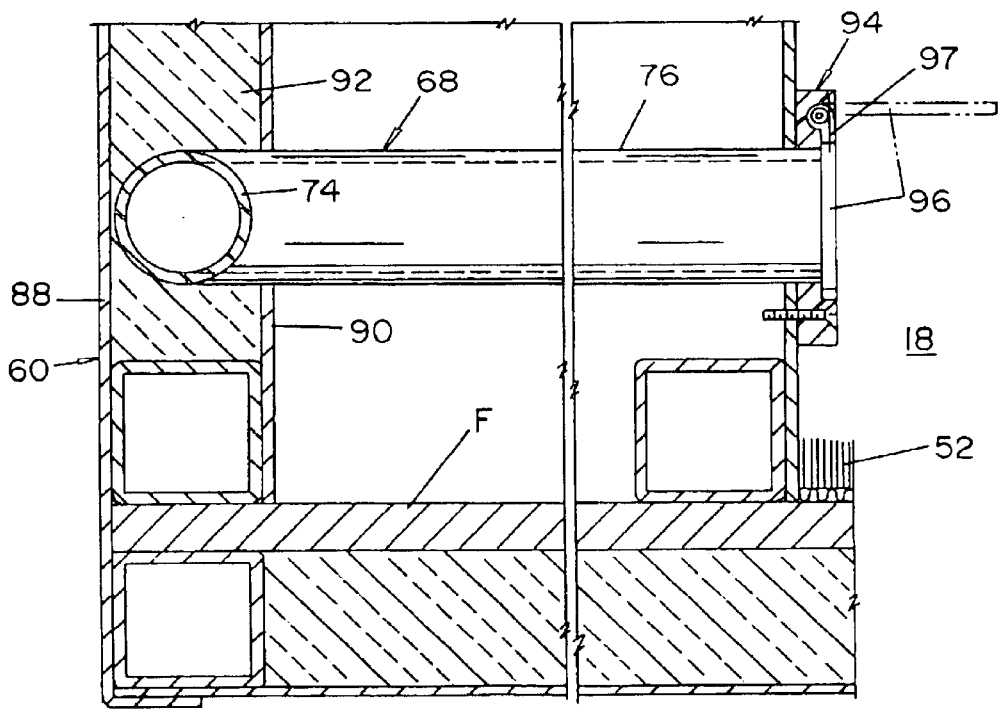
FIG. 3 is a sectional elevation view of a portion of the vacuum line of the system taken along line 3—3 in FIG. 1.

In accordance with the present invention, as shown in FIGS. 1–3, vehicle 10 is provided with a central vacuum cleaning system comprising a vacuum cleaner 66 mounted in closet 24 as set forth more fully hereinafter, a vacuum line designated generally by the numeral 68, and a vacuum hose 70 by which a cleaning tool 72 is connected to the vacuum line, preferably at a selectable one of a plurality of locations along the vacuum line. More particularly in this respect, the vacuum hose has an inlet end 70a for connection to tool 72 and an outlet end 70b for connection to the vacuum line, as will become apparent hereinafter. Preferably, the hose couplings at ends 70a and 70b are identical, hereby the hose is reversible with respect to the connection thereof tool 72 and the vacuum line. Vacuum line 68 can be constructed, for example, from 1–½ inch PVC tubing and couplings and, in the embodiment illustrated, comprises a linear section 74 in wall 60, an end section 76 extending into dining area 18 beneath bench 48, and an end section 78 extending into closet 24 for connection with vacuum cleaner 66. More particularly in this respect, vacuum cleaner 66 has a suction inlet 80 to which end portion 78 of the vacuum line is connected and an exhaust conduit 82 suitably coupled to an exhaust line 84 which extends outwardly through wall 60 of the vehicle and, preferably, includes an exhaust muffler 86.

As will be appreciated from FIG. 3, wall 60 comprises a pair of spaced apart wall panels 88 and 90 extending upwardly from floor F of the vehicle which, in this instance, underlies benches 48 and 50 in dining area 18. Wall panels 88 and 90 may, for example, be plywood, and the space therebetween is filled with a lightweight material 92 such as, for example, balsa wood, fiberglass, foamed plastic, or the like. Portion 74 of vacuum line 68 extends along wall 60 between wall panels 88 and 90, and the terminal end of end portion 76 of the vacuum line is provided with a coupling member 94 which is exposed in area 18 of the vehicle compartment and which is adapted to selectively and removably receive outlet end 70b of vacuum hose 70. Coupling 94 is adapted to be closed, such as by a hinged cover 96, when vacuum hose 70 is disconnected therefrom, and coupling 94 and outlet end 70b of the vacuum hose can be provided with any suitable releasable interengaging arrangement such as, for example, a frictional interengagement, a bayonet-type interconnection, and the like. Preferably, cover 96 is biased to close the open end of the coupling, such as by a biasing spring 97. End portion 78 of the vacuum line includes an identical coupling 94 and cover 96 and which coupling opens into bedroom area 12 for the selective and removable attachment of outlet end 70b of vacuum hose 70 thereto.

Vacuum cleaner 66 is mounted on an interior wall 98 of the vehicle inside closet 24 by means of a mounting bracket 100 having a vertical leg 102 fastened to the vehicle wall and a horizontal leg 104 to which the vacuum cleaner is suitably secured. While not shown, it will be appreciated that vacuum cleaner 66 is hard-wired into the vehicle electrical system, or provided with a line and plug for connection with an electrical receptacle in the vehicle. Likewise, a wall-mounted switch in the vehicle can be connected to the vacuum cleaning wiring for turning the vacuum cleaner on and off. Vacuum cleaner 66 is a canister-type vacuum cleaner having a lower canister portion 66a and an upper cover portion 66b which is detachably connected to the canister portion in a well-known manner such as by releasable clip members. Horizontal portion 104 of bracket 100 is suitably interengaged with cover 66b so that canister portion 66a is suspended therebeneath, and this advantageously provides for the canister portion to be released from cover 66b to facilitate emptying of the canister.

It will be appreciated from the foregoing description that vacuum cleaner hose 70 and a suitable tool attachment such as tool 72 shown in FIG. 1 can be selectively connected to either one of the couplings 94 in areas 12 and 18 of the vehicle compartment to facilitate vacuum cleaning the corresponding area to the extent permitted by vacuum hose 70. It will be appreciated too that the latter can be extendable from a free state so as to facilitate reaching a desired span or area relative to the hose coupling to the vacuum line. Further, such expansion advantageously provides for a minimized free length of the vacuum hose and thus the space required to store the latter. Furthermore, while two couplings 94 are shown for connecting the vacuum cleaner hose to the vacuum line, it will be appreciated that additional couplings could be provided so as to minimize the necessary span of the vacuum hose and tool for cleaning a given area in the vehicle compartment.

Figure 4:
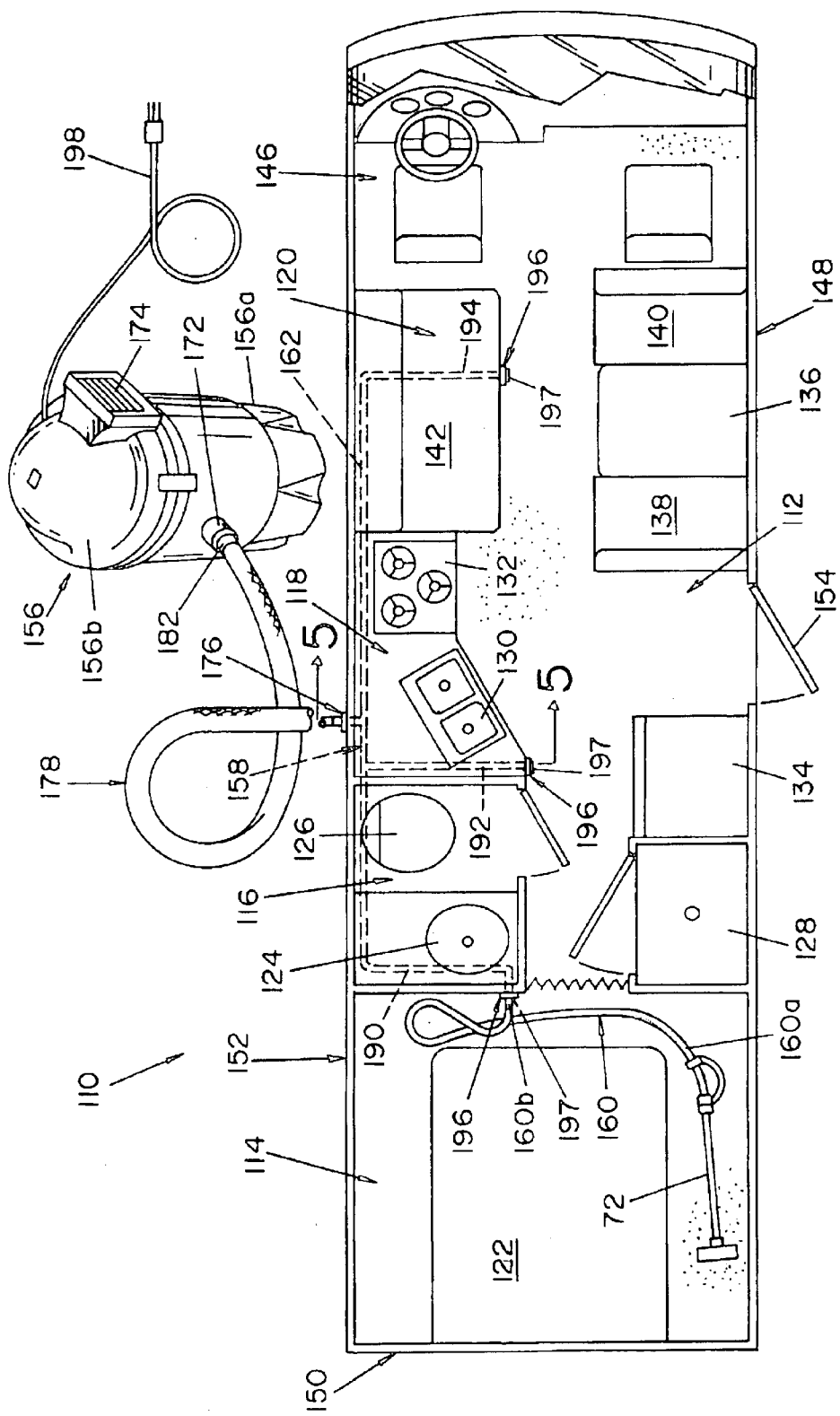
FIG. 4 is a plan view of the interior of another recreational vehicle having a central vacuum system in accordance with the invention.

FIGS. 4 and 5 illustrate another embodiment of a central vacuum system according to the invention in conjunction with a recreational vehicle 110 in the form of a motor home. Vehicle 110 has an interior compartment 112 including a bedroom area 114, a bathroom area 116, a kitchen area 118, and a dining and living area 120. Bedroom area 114 includes a bed 122, bathroom area 116 includes a sink 124 and lavatory 126 on one side of compartment 112 and a shower stall 128 on the other side of the compartment. Kitchen area 118 includes a sink 130 and range top 132 on one side of compartment 112 and a refrigerator 134 on the other side. Dining and living area 120 includes a table 136 and benches 138 and 140 on opposite sides thereof, and a sofa 142. Most often, area 120 is carpeted, the floor in the kitchen area is either wood, linoleum or tile, and the floor in bedroom 114 and the hallway of bathroom area 116 is carpeted. The cab area 146 for the vehicle is forwardly of the living and dining area and, in many instances, the floor in the latter area is carpeted as a continuation of the carpeting in the living and dining area.

Compartment 112 is defined, in part, by walls 148, 150 and 152 extending upwardly from the compartment floor, and wall 148 is provided with a door 154 or accessing the interior of the vehicle. In this embodiment, the vacuum cleaning system comprises a vacuum cleaner 156, a vacuum line 158, and a vacuum hose 160. Vacuum line 158 includes a linear portion 162 in compartment 112 and extending along wall 152 which, as will be appreciated from FIG. 5, comprises spaced apart wall panels 164 and 166 of plywood, or the like, and a lightweight material 168 therebetween, such as balsa wood, fiberglass or plastic foam. Wall 152 extends upwardly from the floor of the vehicle which, in this instance, is defined by flooring 170 beneath sink 130, and wall panel 164 provides an exterior wall surface for the vehicle while panel 166 provides an interior wall surface relative to compartment 112.

Vacuum cleaner 156 has a suction inlet 172 and an exhaust outlet 174, and inlet 172 is adapted to be connected to vacuum line 158 through a coupling 176 extending through wall 152 and a flexible hose 178 which has opposite ends adapted to be releasably interengaged with inlet 172 and coupling 176. More particularly in this respect, coupling 176 has an inner end 176a in flow communication with portion 162 of vacuum line 158 and an outer end 176b adjacent the exterior surface of wall panel 164 for receiving a mating coupling 180 on the inlet end of a vacuum hose 178. The outlet end of hose 178 is provided with a coupling 182 for engaging with suction inlet 172 of the vacuum cleaner. Outer end 176b of coupling 176 is adapted to be closed by means of a cover 184 which is hingedly attached to coupling flange 186 and which, preferably, is biased to close the open outer end of coupling 176 when the vacuum system is not in use, such as by a biasing spring 187. Cover 184 is adapted to be displaced against the spring bias to the broken line position shown in FIG. 5 to enable joining of the couplings 176 and 180 when the system is in use. In this embodiment, linear portion 162 of the vacuum line extends along the inner side of wall 152 adjacent inner wall panel 166. Linear portion 162 of the vacuum line includes branch lines 190, 192 and 194 extending inwardly of compartment 112 respectively beneath the bathroom sink, the kitchen sink, and sofa 142 in living and dining area 120. Each of the branch lines has a terminal end provided with a coupling 196 having a hinged cover 197 and which coupling provides for selectively and removably receiving a mating coupling on outlet end 160b of vacuum hose 160. Inlet end 160a of the vacuum hose includes a coupling for removably receiving vacuum cleaning tools such as tool 72. Preferably, the couplings on the opposite ends of hoses 160 and 178 are identical and couplings 172, 176 and 196 are mateable therewith, whereby the hoses are interchangeable and reversible.

As will be appreciated from the foregoing description, vacuum cleaner 156 can be stored inside the vehicle, or in an exterior storage compartment thereof, together with hoses 160 and 178. When it is desired to vacuum clean the interior compartment 112, the vacuum cleaner is connected to coupling 176 by hose 178, and the power line 198 therefor is plugged into an electrical outlet of the vehicle. Most often, such an outlet is provided exteriorly of the vehicle. Hose 160 is then adapted to be selectively connected to one of the couplings 196 in compartment 112 for cleaning a corresponding area through the use of a selected tool connected to inlet end 160a of the hose. Vacuum cleaner 156 is located outside the vehicle and, accordingly, the interior of the vehicle is free of any obstruction which would result from having to support the vacuum cleaner on a floor area within the compartment which is to be cleaned. In the embodiment illustrated, vacuum cleaner 156 is a canister-type vacuum cleaner having a lower canister portion 156a and a removable cover portion 156b to facilitate access to the interior of the canister for emptying the latter.

FIG. 6 illustrates a modification of the embodiment shown in FIGS. 4 and 5 and in which linear portion 162 of the vacuum line is disposed in wall 152 between wall panels 164 and 166 in the manner described hereinabove in connection with the embodiment shown in FIGS. 1–3.

Figure 7:
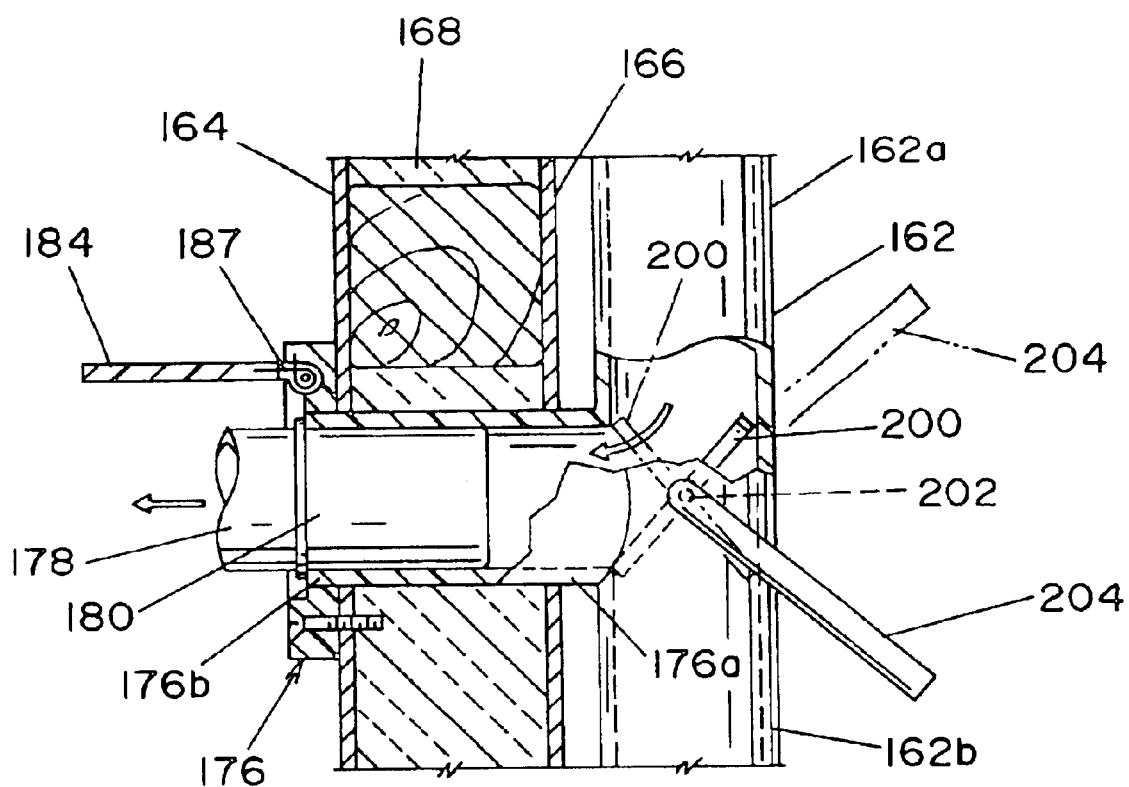

As will be seen in FIG. 4, coupling 176 for connecting the vacuum line to the vacuum cleaner is in linear section 162 of the vacuum line such that portions 190 and 192 thereof are on one side of coupling 176 and portion 194 is on the other side. Accordingly, depending on the length of linear portion 162, or the vacuum power of the vacuum cleaner, it may be desirable to put a diverter valve in the vacuum line so that, for example, vacuum is not drawn in linear portion 162 between coupling 176 and portion 194 when vacuum hose 160 is connected to coupling 196 of either one of the branch lines 190 and 192. Then, by shifting the diverter valve, vacuum would not be drawn in the latter part of the vacuum line when the vacuum hose is attached to coupling 196 of branch line 194. A diverter valve suitable for this purpose is shown in FIG. 7 in connection with vacuum line portion 162 and coupling 176. More particularly in this respect, portion 162a of the vacuum line in FIG. 7 extends from coupling 176 toward branch line 194 and portion 162b extends toward branch lines 190 and 192. A valve plate 200 is pivotally mounted at the intersection of inner end 176a of coupling 176 and vacuum line section 162 by a pivot pin 202 for alternate displacement between the solid line and broken line positions shown, such as by an operating lever 204. When valve plate 200 is in the solid line position, air is adapted to be drawn into section 162 and coupling 176 from branch line 194, and air flow to coupling 176 is blocked in the direction from branch lines 190 and 192. When valve plate 200 is shifted to the broken line position, the air flow into section 162 of the vacuum line and coupling 176 is in the direction from branch lines 190 and 192 and the air flow from broken line 194 is blocked.

While considerable emphasis has been placed herein on the structures and structural interrelationships between component parts of preferred embodiments of the invention, it will be appreciated that many embodiments of the invention can be made and many changes can be made in the preferred embodiments without departing from the principals of the invention. In particular in this respect, for example, in the embodiment of FIGS. 1–3, at least a portion of the vacuum line could be defined by a passage in the vehicle wall rather than a pipe in the wall. Further, couplings 94, 176 and 196 can be covered other than by the spring biased covers described herein and, in this respect for example, could be covered by caps frictionally or threadedly engaged with the outer surface of the coupling at the open end thereof, or by plugs frictionally or threadedly interengaged with the inner surface of the coupling at the outlet end thereof. These and other modifications of the preferred embodiments as well as other embodiments of the invention will be suggested and obvious to those skilled in the art from the disclosure herein, whereby it is to be distinctly understood that the foregoing descriptive matter is to be interpreted merely as illustrative of the invention and not as a limitation.

Having thus described the invention, it is so claimed:

1. A vacuum cleaning system for a recreational vehicle having an internal compartment, comprising a vacuum cleaner having a suction inlet, a vacuum hose having inlet and outlet ends, and a vacuum line in said compartment, said vacuum line including first coupling means for connecting said vacuum line with said suction inlet and second coupling means for connecting said outlet end of said vacuum hose with said vacuum line, said first coupling means having an inner end in flow communication with said vacuum line and an outer end for connection with said suction inlet, said outer end opening exteriorly of said vehicle.

2. The vacuum cleaning system according to claim 1, wherein said vacuum hose is a first vacuum hose, and a second vacuum hose having a first end for connection with said suction inlet and a second end for connection with said outer end of said first coupling means.

3. A vacuum cleaning system according to claim 2, wherein said first coupling means and said second coupling means are structurally identical.

4. A vacuum cleaning system according to claim 1, and a cover for said outer end displaceable between first and second positions respectively covering and uncovering said outer end.

5. A vacuum cleaning system according to claim 4, and means for connecting said cover to said first coupling means against separation therefrom.

6. A vacuum cleaning system according to claim 5, wherein said means for connecting includes hinge means.

7. A vacuum cleaning system according to claim 5, and a spring biasing said cover to said first position.

8. A vacuum cleaning system for a recreational vehicle having an internal compartment, comprising a vacuum cleaner having a suction inlet, a vacuum hose having inlet and outlet ends, a vacuum line in said compartment, and said vacuum line including first coupling means for connecting said vacuum line with said suction inlet and second coupling means for connecting said outlet end of said vacuum hose with said vacuum line, said first coupling means and said second coupling means being structurally identical.

9. A vacuum cleaning system according to claim 1, wherein said second coupling means includes a plurality of coupling elements each having an inner end in flow communication with said vacuum line and an outer end in said compartment.

10. A vacuum cleaning system according to claim 9, and a cover for each of said coupling elements displaceable between first and second positions respectively closing and opening the outer end of the corresponding coupling element.

11. A vacuum cleaning system according to claim 10, and means for connecting said cover to said coupling element against separation therefrom.

12. A vacuum cleaning system according to claim 11, wherein said means for connecting includes hinge means, and a spring biasing said cover to said first position.

13. A vacuum cleaning system for a recreational vehicle having an internal compartment, comprising a vacuum cleaner having a suction inlet, a vacuum hose having inlet and outlet ends, and a vacuum line in said compartment, said vacuum line including first coupling means for connecting said vacuum line with said suction inlet and second coupling means for connecting said outlet end of said vacuum hose with said vacuum line, said second coupling means including a plurality of coupling elements each having an inner end in fluid communication with said vacuum line and an outer end disposed within said compartment, said first coupling means having an inlet end connected to said vacuum line between two of said coupling elements, and a valve for selectively connecting said inlet end of said first coupling means with the inner end of one and the other of said two coupling elements.

14. A vacuum cleaning system according to claim 13, wherein said compartment includes a floor and a wall extending upwardly therefrom, and at least a portion of said vacuum line extends along said floor adjacent said wall.

15. A vacuum cleaning system according to claim 14, wherein said vacuum line includes a tubular conduit, said first coupling means extending through said wall and having an inner end in flow communication with said conduit and an outer end for connection with said suction inlet.

16. A vacuum cleaning system according to claim 15, wherein said outer end of said first coupling means is exteriorly of said vehicle.

17. A vacuum cleaning system according to claim 16, wherein said conduit has opposite ends, and said second coupling means includes a plurality of coupling members spaced apart between said opposite ends.

18. A vacuum cleaning system according to claim 13, wherein said vacuum line is a tubular conduit having opposite ends and said second coupling means includes a plurality of coupling members spaced apart between said opposite ends.

19. A vacuum cleaning system according to claim 18, wherein said first coupling means extends through said wall and has an inner end in flow communication with said conduit between said opposite ends and an outer end exteriorly of said vehicle.

20. A vacuum cleaning system according to claim 19, wherein each of said plurality of coupling members has an outer end for connection with the outlet end of said vacuum hose, and a cover for the outer end of said first coupling means and for the outer end of each of said plurality of coupling members.

21. A vacuum cleaning system according to claim 20, wherein each cover is pivotally mounted on the corresponding one of said first coupling means and said plurality of coupling members.

22. A vacuum cleaning system according to claim 21, wherein each cover is pivotally displaceable between first and second positions respectively covering and uncovering the outer end of the corresponding one of said first coupling means and said plurality of coupling members, and a spring for each cover biasing the cover to the first position thereof.

23. A vacuum cleaning system for a recreational vehicle having an internal compartment that includes a floor and a wall extending upwardly therefrom, said wall comprising spaced apart wall panels, said vacuum cleaning system comprising a vacuum cleaner having a suction inlet, a vacuum hose having inlet and outlet ends, and a vacuum line in said compartment, said vacuum line including first coupling means for connecting said vacuum line with said suction inlet and second coupling means for connecting said outlet end of said vacuum hose with said vacuum line, and at least a portion of said vacuum line is disposed between said wall panels.

24. A vacuum cleaning system according to claim 23, wherein said vacuum line includes a tubular conduit between said wall panels.

25. A vacuum cleaning system according to claim 23, wherein one of said wall panels has an outer side exteriorly of said vehicle, said first coupling means extending through said one wall panel and including an inner end in flow communication with said vacuum line and an outer end adjacent said outer side of said one wall panel.

26. A vacuum cleaning system according to claim 23, wherein said vacuum line has opposite ends and said second coupling means includes a plurality of coupling members spaced apart between said opposite ends.

27. A vacuum cleaning system according to claim 26, wherein said vacuum line includes a tubular conduit between said wall panels.

28. A vacuum cleaning system according to claim 27, wherein one of said wall panels has an outer side exteriorly of said vehicle, said first coupling means including a first coupling member extending through said one wall panel and including an inner end in flow communication with said conduit and an outer end adjacent said outer side of said one wall panel.

29. A vacuum cleaning system according to claim 28, wherein each of said wall panels has an outer side and said second coupling means extends through one of said wall panels and has an inner end in flow communication with said conduit and an outer end adjacent the outer side of the one wall panel.

30. A vacuum cleaning system according to claim 29, wherein said conduit has opposite ends and said second coupling means includes a plurality of coupling members spaced apart between said opposite ends.

31. A vacuum cleaning system according to claim 30, wherein each of said plurality of coupling members has an outer end for connection with the outlet end of said vacuum hose, and a cover for the outer end of said first coupling means and for the outer end of each of said plurality of coupling members.

32. A vacuum cleaning system according to claim 31, wherein each cover is pivotally mounted on the corresponding one of said first coupling means and said plurality of coupling members.

33. A vacuum cleaning system according to claim 32, wherein each cover is pivotally displaceable between first and second positions respectively covering and uncovering the outer end of the corresponding one of said first coupling means and said plurality of coupling members, and a spring for each cover biasing the cover to the first position thereof.

34. A vacuum cleaning system for a recreational vehicle having an internal compartment including a floor and a plurality of walls extending upwardly from said floor and each comprising spaced apart wall panels, said system comprising a vacuum cleaner having a suction inlet, a vacuum hose having inlet and outlet ends, a vacuum line extending along one of said walls adjacent one of the wall panels thereof, first coupling means for connecting said vacuum line with said suction inlet, and second coupling means for connecting said outlet end of said vacuum hose with said vacuum line.

35. The vacuum cleaning system according to claim 34, wherein said vacuum cleaner has an exhaust outlet and said plurality of walls includes an exterior wall, and an exhaust conduit extending through said exterior wall and having an inlet end connected to said exhaust outlet and an outlet end opening exteriorly of said vehicle.

36. The vacuum cleaning system according to claim 34, wherein said vacuum cleaner is mounted in said compartment.

37. The vacuum cleaning system according to claim 34, wherein said vacuum line is in said compartment and extends adjacent said floor and the outer side of said one wall panel.

38. The vacuum cleaning system according to claim 34, wherein said vacuum line is between the wall panels of said one wall.

39. The vacuum cleaning system according to claim 38, wherein said vacuum cleaner is mounted in said compartment.

40. The vacuum cleaning system according to claim 39, wherein said second coupling means includes a plurality of coupling elements each having an inner end in flow communication with said vacuum line and an outer end in said compartment.

41. The vacuum cleaning system according to claim 40, and a cover for each of said coupling elements displaceable between first and second positions respectively closing and opening the outer end of the corresponding coupling element.

42. The vacuum cleaning system according to claim 39, wherein said vacuum line includes a tubular conduit, said first coupling means including a first coupling member connecting said conduit with said suction inlet of said vacuum cleaner.

43. The vacuum cleaning system according to claim 42, wherein said second coupling means includes a second coupling member connected to said conduit at a location spaced from said first coupling member.

44. The vacuum cleaning system according to claim 43, wherein said conduit has an end spaced from said first coupling member and said second coupling member is at said end of said conduit.

45. The vacuum cleaning system according to claim 42, wherein said conduit has two ends spaced from said first coupling member and said second coupling means includes a second coupling member connected to said conduit at each of said two ends.

46. The vacuum cleaning system according to claim 42, wherein said compartment includes an enclosed space accessible through a door and said vacuum cleaner is mounted in said enclosed space.

47. The vacuum cleaning system according to claim 46, wherein said vacuum line includes a tubular conduit, said first coupling means including a first coupling member connecting said conduit with said suction inlet of said vacuum cleaner.

48. The vacuum cleaning system according to claim 47, wherein said vacuum cleaner has an exhaust outlet and said plurality of walls includes an exterior wall, and an exhaust conduit extending through said exterior wall and having an inlet end connected to said exhaust outlet and an outlet end opening exteriorly of said vehicle.

49. The vacuum cleaning system according to claim 34, wherein said second coupling means includes a plurality of coupling elements each having an inner end in flow communication with said vacuum line and an outer end in said compartment and wherein said first coupling means has an inlet end connect to said vacuum line between two of said coupling elements, and a valve for selectively connecting said inlet end of said first coupling means with the inner end of one and the other of said two coupling elements.

50. A vacuum cleaning system for use in operative association with a recreational vehicle having an internal compartment at least partially defined by a floor and a plurality of walls, the plurality of walls extending upwardly from the floor and including spaced-apart wall panels, said vacuum cleaning system comprising:
- a vacuum cleaner having a suction inlet;
- a vacuum hose having an inlet end and an outlet end;
- a vacuum line extending along at least a portion of one of the plurality of walls adjacent an associated one of the wall panels thereof;
- a first coupling fluidically interconnecting said vacuum line and said suction inlet; and,
- a second coupling fluidically interconnecting said outlet end of said vacuum hose and said vacuum line.

51. The vacuum cleaning system of claim 50, wherein said vacuum line includes a length of tubular conduit.

52. The vacuum cleaning system of claim 50, wherein at least a portion of said vacuum line is disposed between the wall panels of at least one of the plurality of walls.

53. The vacuum cleaning system of claim 50, wherein at least a portion of said vacuum line is adjacent the floor.

54. The vacuum cleaning system of claim 50, wherein said vacuum cleaner is supported within the compartment.

55. The vacuum cleaning system of claim 54, wherein said vacuum cleaner includes an exhaust outlet.

56. The vacuum cleaning system of claim 55, wherein said vacuum cleaner includes an exhaust conduit in fluid communication with said exhaust outlet and said exhaust conduit extends through one of the plurality of walls such that said exhaust outlet discharges exteriorly of the vehicle.

57. The vacuum cleaning system of claim 56, wherein said vacuum cleaner includes an exhaust muffler fluidically interconnected along said exhaust conduit.

58. A vacuum cleaning system for use in operative association with a recreational vehicle having an internal compartment, said vacuum cleaning system comprising:
- a vacuum cleaner having a suction inlet;
- a vacuum hose having an inlet end and an outlet end;
- a vacuum line in the compartment, said vacuum line having a first coupling fluidically interconnecting said suction inlet to said vacuum line and a second coupling fluidically interconnecting said outlet end of said vacuum hose to said vacuum line;
- said first coupling having an inner end in fluid communication with said vacuum line and an outer end opening exteriorly of the vehicle and fluidically interconnecting with said suction inlet.

59. The vacuum cleaning system according to claim 58, wherein said vacuum hose is a first vacuum hose and said system further comprises a second vacuum hose fluidically interconnecting said suction inlet and said first coupling.

60. A vacuum cleaning system for use in operative association with a recreational vehicle having an internal compartment, said vacuum cleaning system comprising:
- a vacuum cleaner having a suction inlet;
- a vacuum hose having an inlet end and an outlet end;
- a vacuum line in the compartment, said vacuum line having a first coupling and a plurality of second couplings disposed in spaced relation along said vacuum line, said first coupling fluidically interconnecting said suction inlet with said vacuum line, said plurality of second couplings each having an inner end in fluid communication with said vacuum line and an outer end disposed within the compartment; and,
- a valve fluidically interconnected along said vacuum line between at least two of said plurality of second couplings and operable to selectively direct flow to one or more of said second couplings while substantially fluidically isolating one or more other of said second couplings.

* * * * *